(12) United States Patent
Cherry

(10) Patent No.: US 10,531,752 B2
(45) Date of Patent: Jan. 14, 2020

(54) METHOD FOR ATTACHMENT OF DECORATIVE PIECES TO GLASSWARE ESPECIALLY WINEGLASSES

(71) Applicant: Two Jewels, LLC, Wildwood, MO (US)

(72) Inventor: Candice Cherry, Wildwood, MO (US)

( * ) Notice: Subject to any disclaimer, the term of this patent is extended or adjusted under 35 U.S.C. 154(b) by 260 days.

(21) Appl. No.: 15/633,990

(22) Filed: Jun. 27, 2017

(65) Prior Publication Data

US 2018/0368595 A1 Dec. 27, 2018

(51) Int. Cl.
| | |
|---|---|
| *B65D 23/14* | (2006.01) |
| *A47G 19/22* | (2006.01) |
| *B65D 25/20* | (2006.01) |
| *C09J 5/00* | (2006.01) |
| *C09J 201/00* | (2006.01) |
| *C09J 5/02* | (2006.01) |

(52) U.S. Cl.
CPC ......... *A47G 19/2227* (2013.01); *B65D 23/14* (2013.01); *B65D 25/205* (2013.01); *C09J 5/00* (2013.01); *C09J 5/02* (2013.01); *C09J 201/00* (2013.01); *C09J 2205/31* (2013.01); *C09J 2400/143* (2013.01); *C09J 2400/146* (2013.01)

(58) Field of Classification Search
CPC .............................. B65D 23/14; B65D 25/205
See application file for complete search history.

(56) References Cited

U.S. PATENT DOCUMENTS

| | | | | |
|---|---|---|---|---|
| 5,560,796 A | * | 10/1996 | Yoshimura | B44C 1/1716 156/240 |
| 5,711,216 A | * | 1/1998 | Tiemann | B41F 15/0872 101/118 |
| 6,283,022 B1 | * | 9/2001 | Kamen | B41F 15/0872 101/120 |
| 2008/0121331 A1 | * | 5/2008 | Beasley | B44F 1/066 156/63 |

FOREIGN PATENT DOCUMENTS

| | | | |
|---|---|---|---|
| JP | 07285297 A | * 10/1995 | |
| WO | WO-2015005057 A1 | * 1/2015 | ............. B44C 3/048 |

OTHER PUBLICATIONS

Machine Translation of WO-2015005057-A1 (Year: 2015).*
Machine Translation of JP-07285297-A (Year: 1995).*

* cited by examiner

*Primary Examiner* — Daniel McNally

(57) ABSTRACT

A method of producing a wine glass (W) to which a decorative piece (J) is mounted and permanently held in place. The method includes first selecting a decorative piece from a plurality of decorative pieces, then cleaning a portion of the glass to which the decorative piece is to be attached. Next, a glue is applied to a backside of the decorative piece, the backside being fitted against an outer surface of the glassware, and the glue including a resin sensitive to ultraviolet (UV) light. Finally, the wine glass and decorative piece are radiated with an ultraviolet light having a defined wavelength for a predetermined period of time for the light to cure the resin and permanently affix the decorative piece to the wine glass.

6 Claims, 2 Drawing Sheets

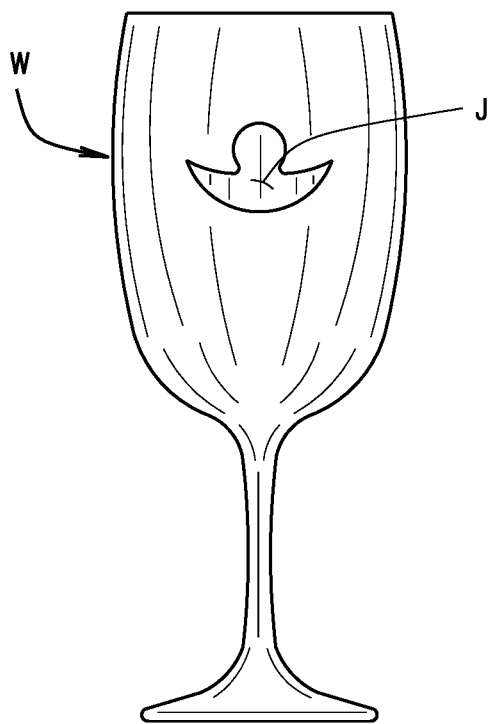
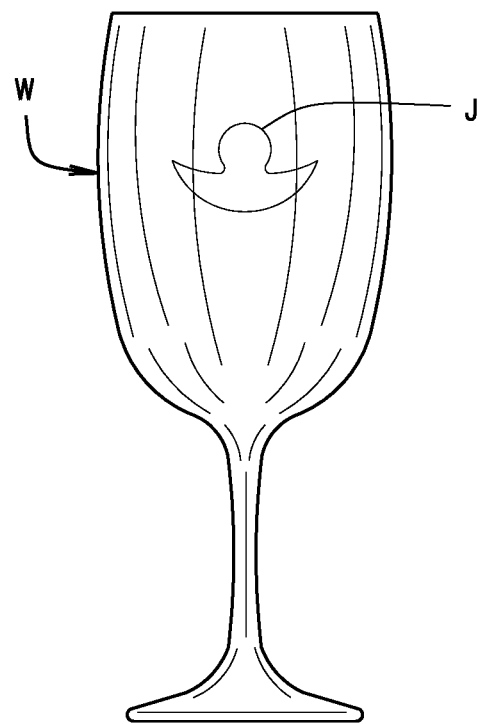
FIG. 1A            FIG. 1B
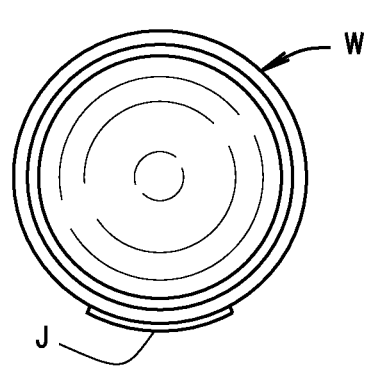
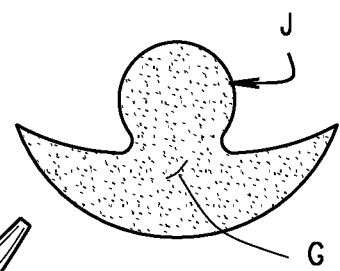
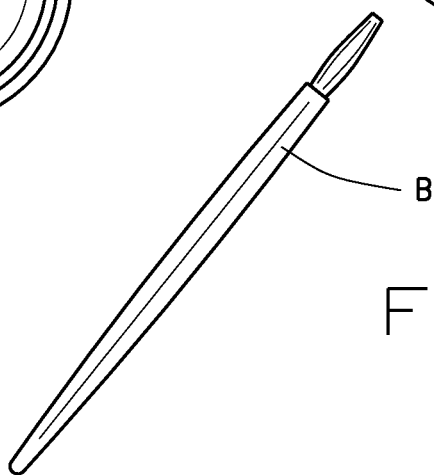
FIG. 2            FIG. 3

METHOD FOR ATTACHMENT OF DECORATIVE PIECES TO GLASSWARE ESPECIALLY WINEGLASSES

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to glassware; and, more particularly, to a method for making jewel encrusted art ware for attachment to glassware, and particularly wine glasses.

Etched glassware has been known for a long time. The method of making such glassware is known in the art and is not discussed. Etched glassware includes decorative designs and can be expensive both to manufacture and purchase. More recently, it has become fashionable to attach decorative pieces to glassware as an alternative to etching. A common method of doing this is to take, for example, a brooch such as a jeweled brooch, remove the clip used to attach the brooch to an article of clothing, bend the brooch so its contour approximates the curvature of glass to which the brooch is to be attached, and then glue the brooch to the side of the glass.

Such a process is both time consuming and expensive. That is, assembler can only work with one piece of jewelry at a time, the piece may be damaged at any point during the removal of the clip and bending (so that the piece may have to be discarded); and unless the piece can be formed so its contour precisely matches that of the glass to which it is attached, the piece may not remain in place, have to be reattached, or either it or the glass may wind up broken.

It would therefore be advantageous t have a process that allowed decorative pieces, especially jeweled or jewelry pieces to be fabricated so their attachment to glassware was easy to do and the results long wearing.

BRIEF SUMMARY OF THE INVENTION

The present disclosure is directed to a method of attaching decorative pieces to glassware; particularly to stemmed and stemless wineglasses as well as other types of glassware. The decorative pieces may be jeweled pieces and the pieces may be themed; that is, they may have a sports motif, a nautical motif, etc.

The method includes steps of cleaning the glasses and the decorative pieces, placing a plurality of glasses on a rack by which they are positioned so they can be subjected to a particular type of light, applying a particular resin to the back of each decorative piece, then placing each piece on the side of a glass and subsequently curing the resin for a predetermined period so that the resin hardens and secures the decorative piece to the side of the glass.

In a second embodiment of the invention, glasses are mounted on a rack and enclose a light bulb when installed. This configuration decreases curing time to permanently affix a decorative piece to glassware and increases throughput of the decorative glassware.

The method facilitates producing a significant number of decorated glasses at the same thereby reducing costs while providing a quality finished product. The method is therefore economical to use.

Other objects and features will be in part apparent and in part pointed out hereinafter.

BRIEF DESCRIPTION OF THE SEVERAL VIEWS OF THE DRAWINGS

The accompanying figures, together with detailed description which follows, form part of the specification and illustrate the various embodiments described in the specification.

FIG. 1A is a first elevation view of a wine glass with a decorative jeweled piece attached to the side of the glass, the glass being viewed from the front of the decorative piece;

FIG. 1B is a second elevation view of the wine glass, the glass being viewed from the opposite side to show the rear of the decorative piece;

FIG. 2 is a top view of the glass and decorative;

FIG. 3 illustrates application of a resin to the backside of a decorative jeweled piece;

Corresponding reference characters indicate corresponding parts throughout the several views of the drawings.

DETAILED DESCRIPTION OF INVENTION

Figure 4:
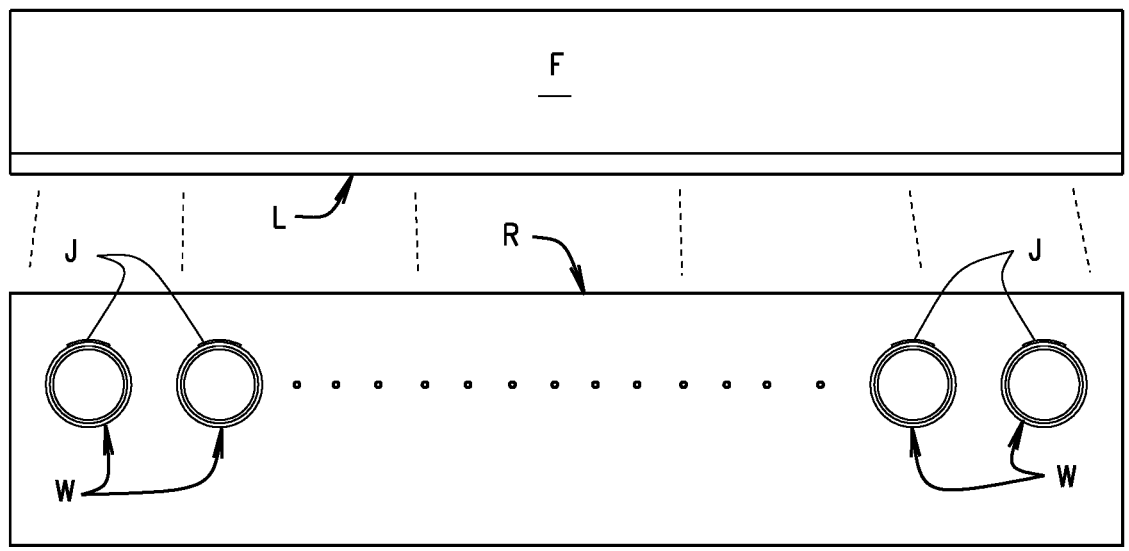
FIG. 4 illustrates a rack on which glasses are mounted after and a lighting system for illuminating the glasses after the decorative pieces have been attached to them to cure a resin used to affix the decorative pieces to the glasses; and, FIG. 5 illustrates a second rack on which glasses are mounted with a separate light enclosed by the glass when in place on the rack.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, a stemmed wineglass indicated generally W has a decorative jeweled piece J attached to the side of the glass at its upper end as shown in FIGS. 1A-1C. The jeweled piece may be any of a number of jeweled pieces including themed pieces from various collections such as are shown on applicant's website www.thequeensjewels.net As shown in the drawings, the jeweled piece J is formed to have a curvature corresponding to that of the side of wineglass W with one or more jewels fitted to the outer surface of the piece.

To make the product, first, each glass W is cleaned and wiped with a cloth to remove any foreign material from the outer surface of the glass. This is done to insure that a decorative piece J properly adheres to the outside of the glass after it is attached to the glass.

Next, a plurality of wineglasses W is mounted on a rack R. The rack can hold, for example, up to twenty-four (24)

wineglasses W. As shown in FIG. 4, the wineglasses are arranged horizontally on rack R.

Next, as shown in FIG. 3, a glue G is applied to the back of a decorative piece J using a brush B, a sprayer (not shown), or other instrument. The glue comprises a resin which is sensitive to ultra-violet (UV) light. The entire backside of a decorative piece J is covered with the glue to achieve maximum adherence of the piece to the wineglass once the resin in the glue is cured. After the glue is completely applied to a piece J, the piece is fitted to an upper portion of the surface of the wineglass as shown in the drawings.

As shown in FIG. 4, a light fixture F is mounted above rack R. Fixture F is, for example, a fluorescent light fixture in which is installed a UVA fluorescent light bulb L. For the purpose of effecting curing of the resin, an ultraviolet light emitted by bulb L has a wavelength in the range of 315-400 nm and this light radiates the glasses W installed in rack R and their associated decorative pieces J. A UVA fluorescent light bulb manufactured by General Electric Corporation under its model name GE F40BL has been found to be suitable for this purpose.

After all of the decorative pieces J are fitted onto the respective wineglasses, the fluorescent light bulb in fixture F is turned "on" for a predetermined period of time for light radiated from the bulb to cure the resin. This period is, for example, approximately five (5) minutes. Once the resin has cured, the decorative pieces J are permanently attached to the wineglasses. Further, the cured resin is optically clear meaning that if the wineglass is viewed from the back of the glass no distortion between the glass and decorative piece can be seen.

The wineglasses are now removed from rack R, cleaned, packaged, and sent to their purchaser.

Particular advantages of the method of the present invention are that a number of decorative pieces J can be simultaneously processed with the wineglasses to which they are fitted rather than processing one at a time. This increases throughput of the end product while saving time and labor costs. In addition, not all of the decorative pieces fitted to wineglasses and cured have to be of the same design. Rather, each decorative piece can be of a different design so batches including only, a few, or a large number of pieces can be processed at the same time so to further increase throughput while reducing production time and costs.

Figure 5:
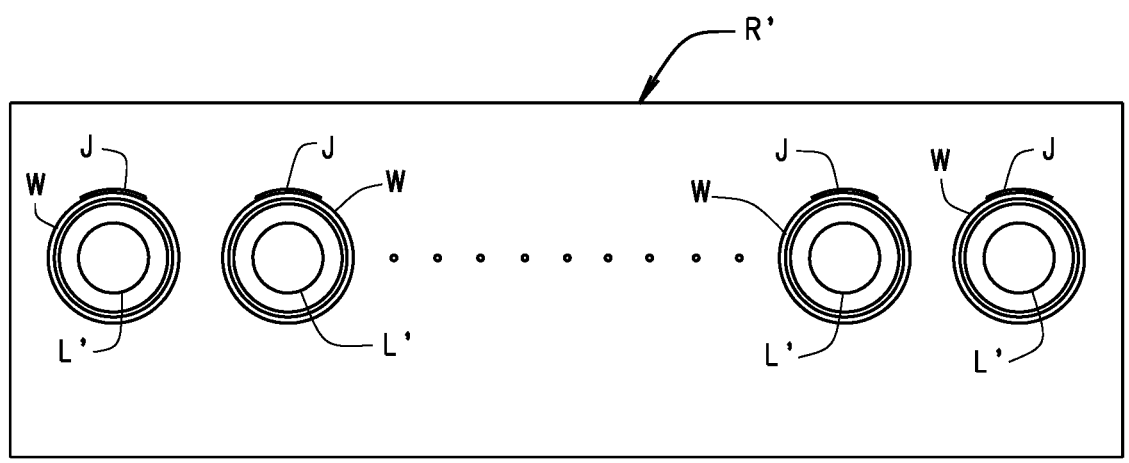

Referring to FIG. 5, In a second embodiment of the invention, a rack R' is also constructed to hold a plurality of glasses W'. Now, a separate UVA fluorescent light bulb L' is provided for each glass for each glass W, the bulbs L being mounted on the rack and extending outwardly from it so to be enclosed by a glass W installed on the rack. Since a bulb L is now on the inside of a glass mounted on the rack it is much closer in proximity to the glassware than in the previously described embodiment. Since the light emitted by the bulb is now closer to the bonding surface of the decorative piece J and its associated glass W, the curing time is reduced which, in turn, increases the throughput of decorated glassware.

While the above description has been for stemmed wineglasses, those skilled in the art will appreciate that the method can also be used with stemless wineglasses, glass swingtop bottles, pilsner glasses, high ball glasses and glass coffee mugs. Also, the method may be used with plastic drinking vessels In view of the above, it will be seen that the several objects and advantages of the present disclosure have been achieved and other advantageous results have been obtained.

The invention claimed is:

1. A method of producing glassware to which decorative pieces are mounted and permanently held in place comprising: selecting a decorative piece from a plurality of decorative pieces; cleaning a portion of the glassware to which the decorative piece is to be attached; applying a glue to a backside of the decorative piece, said backside to be fitted against an outer surface of the glassware, and said glue including a resin sensitive to ultraviolet (UV) light; radiating the glassware and decorative piece fitted to the glassware with an ultraviolet light for a predetermined period of time for the light to cure the resin and permanently affix the decorative piece to the glassware; and further including a rack capable of holding a plurality of glassware and installing glassware in the rack prior to fitting a decorative piece to the outer surface of the glassware wherein a plurality of ultraviolet light bulb are mounted on the rack and extend outwardly therefrom, each bulb being enclosed by a glassware when the glassware is installed on the rack.

2. The method of claim 1, in which the glassware is fitted horizontally into the rack.

3. The method of claim 2 wherein radiating the glassware and decorative piece fitted to the glassware with an ultraviolet light includes radiating them with an ultraviolet light having a wavelength in the range of 315-400 nm.

4. The method of claim 1, further including a light fixture installed above the rack and in which are installed UVA fluorescent light bulbs, the method including radiating the glassware with the fitted decorative piece with light from the UVA fluorescent light bulbs for a predetermined period of time to cure the resin and permanently affix the decorative piece to the glassware.

5. The method of claim 4 in which the predetermined period of time is approximately five (5) minutes.

6. The method of claim 1, further including manufacturing glassware with decorative pieces attached in batches at the same time with different batches having different decorative pieces attached to the glassware.

* * * * *